United States Patent
Tryon et al.

(10) Patent No.: US 8,251,675 B2
(45) Date of Patent: Aug. 28, 2012

(54) INPUT SHAFT DRIVEN HYBRID TRANSMISSION PUMP

(75) Inventors: Eric S. Tryon, Indianapolis, IN (US); Timothy J. Reinhart, Brownsburg, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 918 days.

(21) Appl. No.: 12/234,867

(22) Filed: Sep. 22, 2008

(65) Prior Publication Data
US 2009/0252622 A1      Oct. 8, 2009

Related U.S. Application Data

(60) Provisional application No. 61/041,934, filed on Apr. 3, 2008.

(51) Int. Cl.
*F04B 17/00*     (2006.01)
(52) U.S. Cl. ........................ 417/364; 418/61.3
(58) Field of Classification Search .................. 417/364, 417/410.4; 418/61.3, 61.1, 27, 36; 475/334–335
See application file for complete search history.

(56) References Cited

U.S. PATENT DOCUMENTS

| | | | | |
|---|---|---|---|---|
| 6,048,179 | A | * | 4/2000 | Forster .......................... 417/364 |
| 2004/0071559 | A1 | * | 4/2004 | Ai et al. ........................ 417/220 |

FOREIGN PATENT DOCUMENTS

EP      0342183 A2     11/1989

* cited by examiner

*Primary Examiner* — Anne Hines
(74) *Attorney, Agent, or Firm* — Quinn Law Group, PLLC

(57) ABSTRACT

A pump for a hybrid transmission includes an input shaft having a mating surface—which may include a flat portion—on an outer surface thereof, and a pump rotor coaxial with the input shaft. The pump rotor has an inner surface corresponding to the mating surface of the input shaft, and is directly and drivingly coupled to the input shaft for common rotation therewith. The hybrid transmission may further include an input housing and pump housing, and a pump pocket—in which the pump rotor operates—defined by the input housing, pump housing, and input shaft. The pump is configured to be testable prior to mating the hybrid transmission to an engine. The pump rotor is bounded axially by the input shaft, and a pump guide is configured to center the pump rotor, and to be installed prior to installation of the pump rotor.

14 Claims, 3 Drawing Sheets

INPUT SHAFT DRIVEN HYBRID TRANSMISSION PUMP

CROSS-REFERENCE TO RELATED APPLICATIONS

This application claims the benefit of U.S. Provisional Application No. 61/041,934, filed Apr. 3, 2008, which is hereby incorporated by reference in its entirety.

TECHNICAL FIELD

The present invention relates to vehicular drivetrains, and more particularly, to transmissions for hybrid and hybrid-type vehicles.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power.

Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

To operate properly, the transmission usually requires a supply of pressurized fluid, such as conventional transmission oil. The pressurized fluid may be used for such functions as cooling, lubrication, and, in some cases, operation of the torque transfer devices. The lubricating and cooling capabilities of transmission oil systems impact the reliability and durability of the transmission. Additionally, multi-speed transmissions require pressurized fluid for controlled engagement and disengagement of the torque transmitting mechanisms that operate to establish the speed ratios within the internal gear arrangement.

In hybrid vehicles, alternative power is available to propel the vehicle, minimizing reliance on the engine for power, thereby increasing fuel economy. Since hybrid vehicles can derive their power from sources other than the engine, engines in hybrid vehicles can be turned off while the vehicle is propelled by the alternative power source(s). For example, electrically variable transmissions alternatively rely on electric motors housed in the transmission to power the vehicle's driveline.

An electric generator can transform mechanical power from the engine into electrical power, and an electric motor can transform that electric power back into mechanical power at different torques and speeds for the remainder of the vehicle drive system. These functions may be combined into a single electric machine, a motor/generator. An electric storage battery used as a source of power for propulsion may also be used, allowing storage of electrical power created by the generator, which may then be directed to the electric motor for propulsion or used to power accessory equipment.

A series hybrid system allows the engine to operate with some independence from the torque, speed and power required to propel a vehicle, so the engine may be controlled for improved emissions and efficiency. Such a system may also allow the electric machine attached to the engine to act as a motor to start the engine. This system may also allow the electric machine attached to the remainder of the drive train to act as a generator, recovering energy from slowing the vehicle and storing it in the battery by regenerative braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can allow both motor/generators to act as motors. Both motors can sometimes act as generators to recharge the battery, especially in regenerative vehicle braking.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is mechanical.

One form of differential gearing, as is well known to those skilled in this art, may constitute a planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system may include one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

SUMMARY OF THE INVENTION

A pump for a hybrid transmission is provided. The pump includes an input shaft having a mating surface on an outer surface of the input shaft and a pump rotor coaxial with the input shaft. The pump rotor has an inner surface corresponding to the mating surface of the input shaft, and the pump rotor is directly and drivingly coupled to the input shaft for common rotation therewith, by engagement of the mating and inner surfaces. The mating surface between the input shaft and pump rotor may include a flat portion. The hybrid transmission may further include an input housing and a pump housing, and a pump pocket may be defined by the input housing, pump housing, and input shaft. The pump rotor operates in the pump pocket.

The pump may be configured to be tested prior to mating the hybrid transmission to an engine. The axial length of the pump rotor is less than the axial length of the input shaft, and the pump rotor is bounded axially by the input shaft. The pump may also include a pump guide configured to center the pump rotor, and configured to be installed prior to installation of the pump rotor.

The above features and advantages, and other features and advantages of the present invention are readily apparent from the following detailed description of the best modes for carrying out the invention when taken in connection with the accompanying drawings.

DESCRIPTION OF PREFERRED EMBODIMENTS

Figure 1:
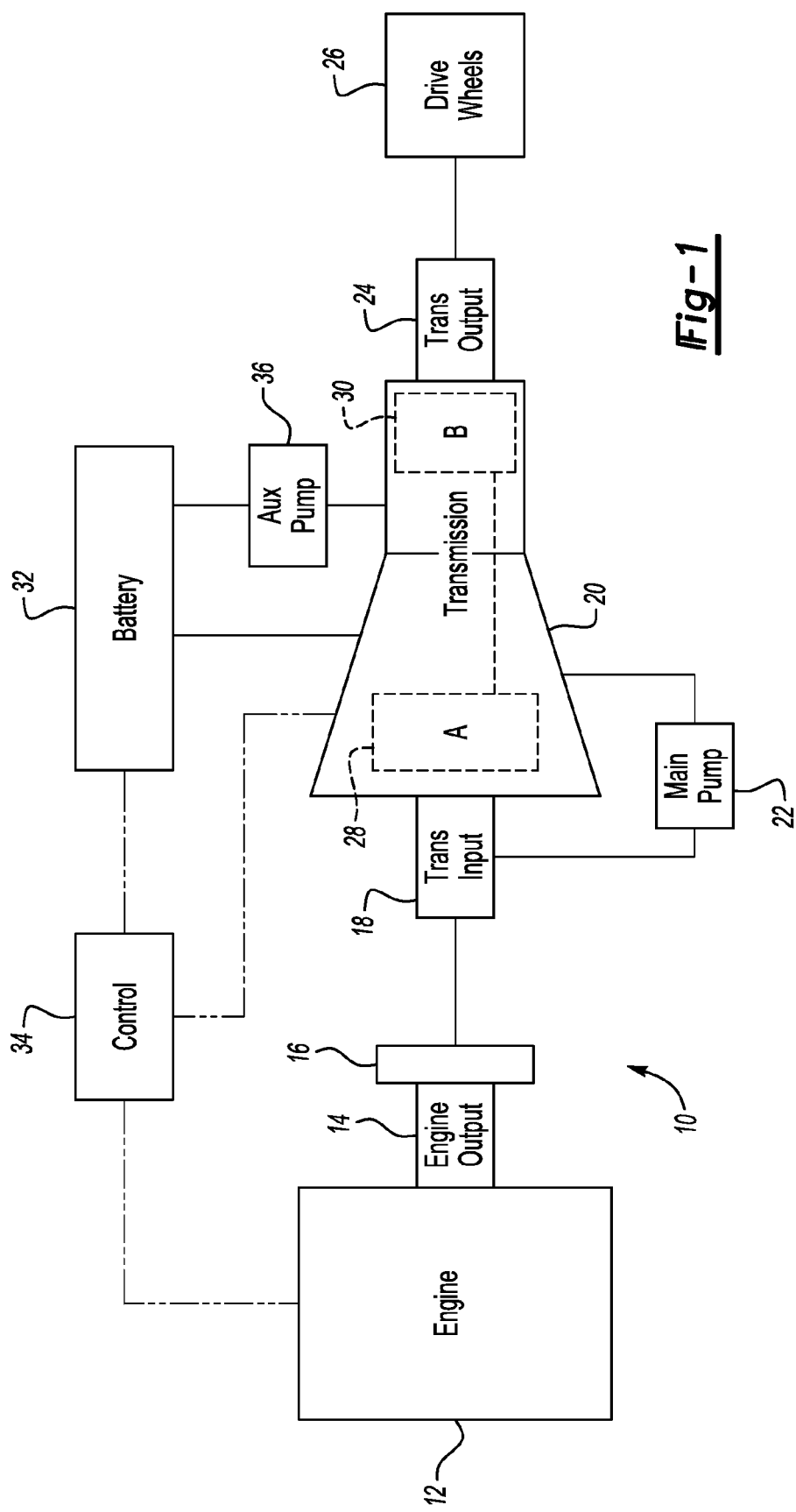
FIG. 1 is a schematic representation of a powertrain into which one embodiment of the claimed invention may be incorporated.

With reference to FIG. 1, there is shown a schematic diagram of a powertrain 10 into which the claimed invention may be incorporated. The powertrain 10 includes an engine 12, which may be any type of internal combustion engine known in the art, turning an engine output 14, which transmits the driving power produced by the engine 12. Driving power is then transferred through a transmission input shaft 18 into a transmission 20. In some embodiments, a damper 16 may be interposed between the engine output 14 and the transmission input shaft 18. Input shaft 18 is described in more detail below, with reference to FIG. 2.

Input shaft 18 may be operatively connectable to planetary gear members (not shown) or to torque transfer devices (not shown) within transmission 20. The transmission 20 may be an electrically variable transmission, a one- or two-mode input split transmission, a two-mode transmission with input-split and compound-split, or another hybrid transmission known to those having ordinary skill in the art.

Transmission 20 utilizes input shaft 18 to receive power from the vehicle engine 12 and a transmission output 24 to deliver power to drive the vehicle through one or more drive wheels 26. In the embodiment shown in FIG. 1, transmission 20 includes a first motor 28 and a second motor 30. Each of the motors 28 and 30 is a motor/generator capable of both converting electric power into mechanical power and converting mechanical power into electric power. The first motor 28 may also be referred to as motor A, and second motor 30 may be referred to as motor B.

The fluid in transmission 20 is pressurized by a main pump 22. The pressurized fluid may be used for such functions as cooling, lubrication, and, in some cases, operation of the torque transfer devices. Most transmission pumps are directly or indirectly driven by rotation of the engine output member—such as the engine crankshaft, engine driven damper, or torque converter assembly drive hub—to drive the pump rotor. However, the main pump 22 is driven directly by the transmission input shaft 18. The input-driven main pump 22 will be described in more detail below, with reference to FIGS. 2 and 3.

The transmission 20 may utilize one or more planetary gear sets (not shown), and may utilize one or more clutches (not shown) to provide input split, compound split, and fixed ratio modes of operation. The planetary gear sets may be simple or may be individually compounded.

The motors 28 and 30 are operatively connected to a battery 32 (an energy storage device) so that the battery 32 can accept power from, and supply power to, the first and second motor/generators 28 and 30. A control system 34 regulates power flow among the battery 32 and the motors 28 and 30.

As will be apparent to those having ordinary skill in the art, the control system 34 may further control the engine 12 and operation of the transmission 20 to select the output characteristics transferred to the drive wheels 26. Control system 34 may incorporate multiple control methods and devices.

As will further be recognized by those having ordinary skill in the art, battery 32 may be a single chemical battery or battery pack, multiple chemical batteries, or other energy storage device suitable for hybrid vehicles. Other electric power sources, such as fuel cells, that have the ability to provide, or store and dispense, electric power may be used in place of battery 32 without altering the claimed invention.

In some modes of operation for the powertrain 10, the engine 12 may shut down or turn off completely. This may occur when the control system 34 determines that conditions are suitable for drive wheels 26 to be driven, if at all, solely by alternative power from one or both of motors 28 and 30; or may occur during periods of regenerative braking. While the engine 12 is shut down, the main pump 22 is not being driven by the input shaft 18, and is therefore not providing pressurized fluid to transmission 20. Powertrain 10 may therefore include an auxiliary pump 36, which may be powered by the battery 32 to provide pressurized fluid to transmission 20 when additional pressure is required.

Figure 2:
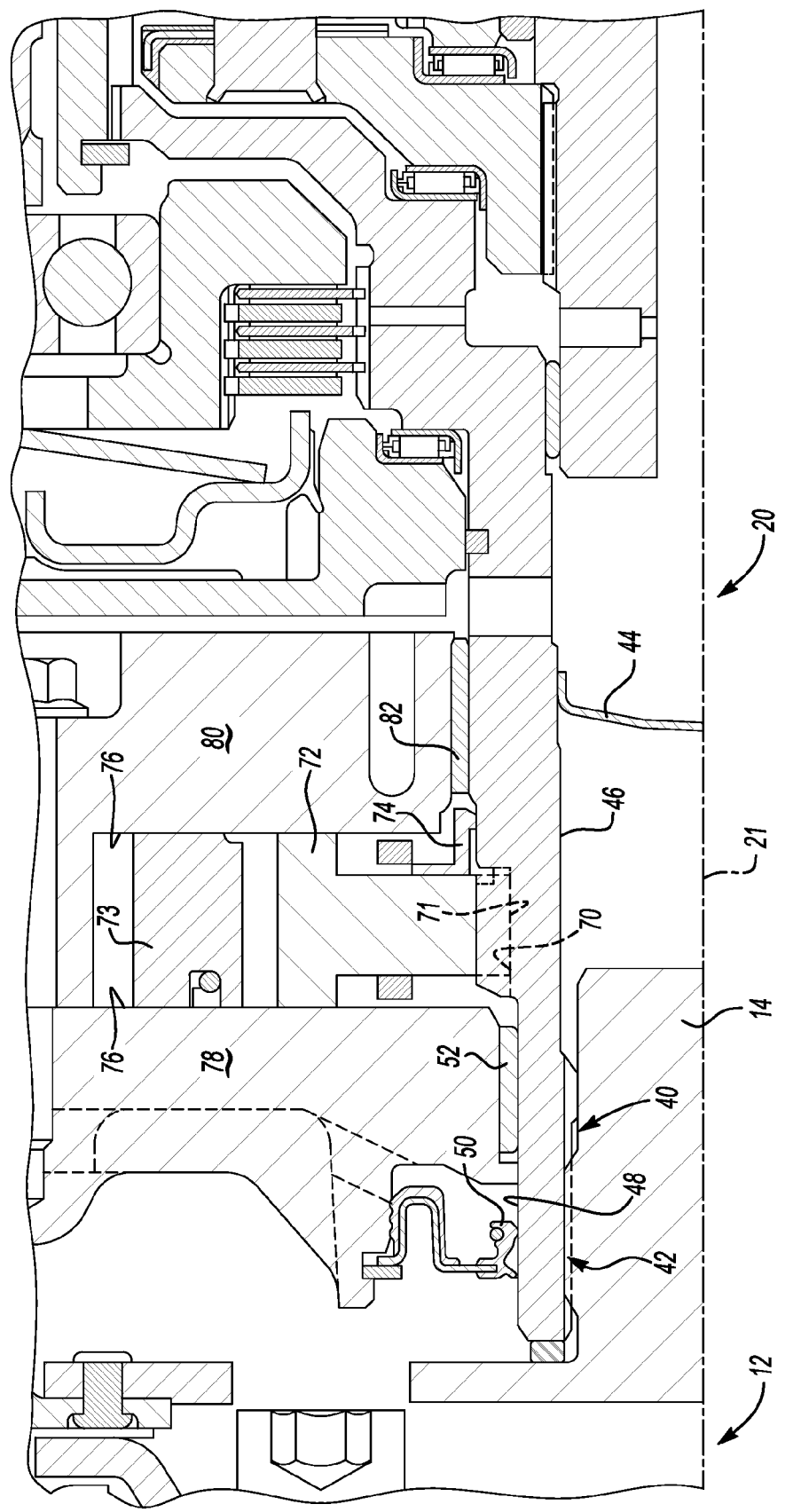
FIG. 2 is a schematic cross section of the dry-mating interface between the engine output and transmission input shown schematically in FIG. 1, showing the pump rotor and pump pocket in the transmission pump housing.

Referring to FIG. 2, there is shown one possible embodiment of a portion of the power train 10 shown schematically in FIG. 1. More specifically, FIG. 2 shows a more-detailed, cross-sectional view of the area transferring power from the engine 12 to the transmission 20. In this embodiment, the engine 12 is transferring power through an engine output 14, which may be a crank shaft, a damper hub, or another shaft-type output member capable of transferring power to the transmission 20.

As shown in FIG. 2, power is transferred to the transmission 20 by a hollow, internally-splined input shaft 18. FIG. 2 shows only the upper half of transmission 20. Input shaft 18 is symmetrical about axis 21, as are many of the other rotating members of transmission 20. The input shaft 18 has internal dry splines 40 (also shown in FIG. 3) which may be mated to external dry splines 42 on the engine output 14. These splines 40 and 42 are maintained as dry splines by sealing them against pressurized transmission fluid contained in the transmission 20.

Dry splines, as opposed to wet splines, are not continuously in fluid communication with transmission fluid or engine oil. Dry splines may, however, have grease applied to one or both sets of splines before installation. Such pre-installation grease assists in the dry-mating process and may provide any necessary lubrication for the life of the parts. In this embodiment, sealing against transmission fluid is accomplished with a freeze plug 44, which is an expandable plug, press-fit into an internal cavity 46 of the input shaft 18. However, as will be recognized by those having ordinary skill in the art, sealing could also be accomplished by an input shaft that is not completely hollow.

In the embodiment shown in FIG. 2, input shaft 18 is completely hollow, which allows the internal dry splines 40 to be manufactured as broached internal splines instead of shaped splines. As would be recognized by those having ordinary skill in the art, a broaching bar is pulled through the internal cavity 46 and cuts the internal dry splines 40. Because the internal dry splines 40 are broached, there may be a significant cost improvement versus having to shape the splines to manufacture the input shaft 18.

Opposite the internal cavity 46 of the input shaft 18 is an outer surface, the input shaft journal 48, which also must be sealed against pressurized transmission fluid. An input seal 50 and an input housing bushing 52 ride against the input shaft journal 48 instead of a damper or the engine output 14, and accomplish sealing the input shaft journal 48. The input seal 50 and input housing bushing 52 can therefore be installed along with the input shaft 18, which reduces the opportunity for cutting seals during assembly of the transmission. Furthermore, the input seal 50 and input housing bushing 52 do not have to be in contact with the engine output 14 or test equipment used to simulate the engine output 14 during the manufacturing process. This yields a one-time engagement of the input shaft journal 48 to the input seal 50 and input housing bushing 52.

Main pump 22 is driven by the sealed portion of the input shaft 18. Input shaft journal 48 is designed with one or more mating surfaces to pilot and drive a pump rotor 72. In the embodiment shown, the mating surfaces are flats 70 (shown as a dashed or phantom line in FIG. 2, also shown in FIG. 3). The pump rotor 72 has inner flats 71 (also shown as a phantom line in FIG. 2) on an inner surface thereof. The inner flats 71 correspond to, and are configured to mate with, the flats 70.

The flats 70 and inner flats 71 are configured to transfer power from the input shaft 18 to the pump rotor 72, thereby allowing the main pump 22 to pressurize fluid in the transmission 20. Other mating structures or surfaces may be used to directly transfer power between the input shaft 18 and the main pump 22; for example, without limitation: splines, keyways, polygonal shafts, et cetera.

The flats 70 and inner flats 71, along with a pump guide 74, center and guide the pump rotor 72 during assembly and operation of the main pump 22 in the transmission 20. Pump rotor 72 and a pump slide 73 rotate and create pressure inside of a pump pocket 76 formed at least partially by the transmission input housing 78 and the pump housing 80. The pump slide 73 allows the main pump 22 to generate variable fluid displacement and, therefore, pressure.

An input-driven main pump 22 with pump pocket 76 placed inside of the pump housing 80 may decrease the axial length (relative to, and as measured along, axis 21) of the transmission 20 and main pump 22. Driving the main pump 22 by directly coupling it to the input shaft 18 may save greater than 5 millimeters of axial length, and allows the main pump 22 to be completely bounded within the axial length of the input shaft 18. A pump housing bushing 82 and the input housing bushing 52 handle loads created by the main pump 22.

Figure 3:
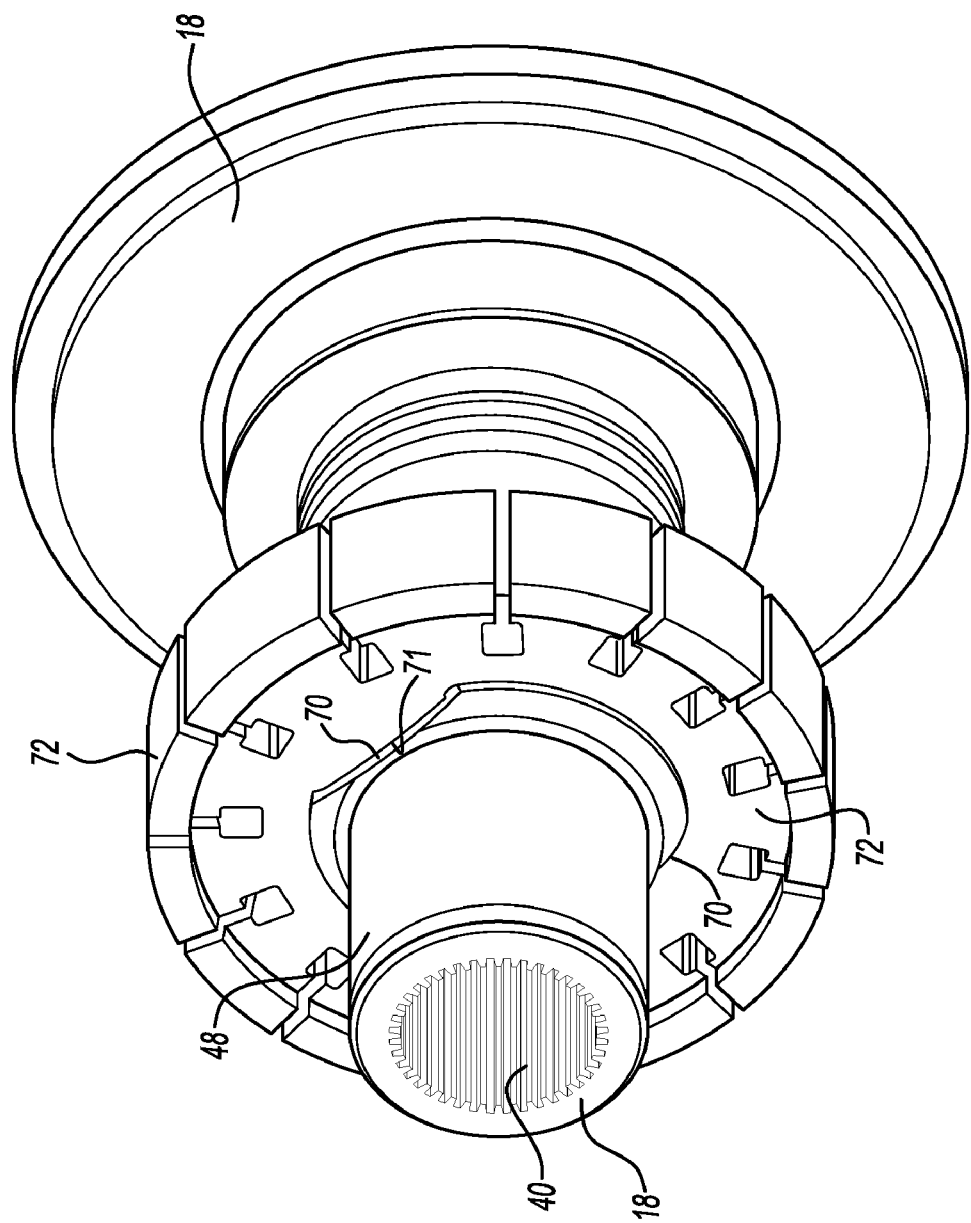
FIG. 3 is a schematic perspective view of the transmission input shaft and pump rotor.

FIG. 3 shows the input shaft 18 and pump rotor 72. This view shows the internal dry splines 40 on the inside of input shaft 18. FIG. 3 also shows the flats 70 cut into the input shaft journal 48 and the inner flats 71 (the corresponding mating surface) on the pump rotor 72.

By using internal dry splines 40, the engine 12 and transmission 20 are connected at a single, dry interface point (having only pre-installation grease on the dry splines). In the manufacturing process, this allows dry-mating the input shaft 18 to the engine output 14, which may reduce the difficulty, time, and cost of manufacturing the powertrain 10. Furthermore, the dry-mating process allows the transmission 20 to be filled with transmission fluid prior to mating the engine 12 and transmission 20, possibly even prior to shipping the transmission 20 to the final assembly point. Main pump 22 may also be tested—individually or as a component of the assembled transmission 20—prior to mating of transmission 20 and engine 12.

While the best modes for carrying out the claimed invention have been described in detail, those familiar with the art to which this invention relates will recognize various alternative designs and embodiments for practicing the invention within the scope of the appended claims.

The invention claimed is:

1. A pump for a hybrid transmission, comprising:
   an input shaft having a mating surface on an outer surface thereof;
   a pump rotor coaxial with said input shaft, having an inner surface corresponding to said mating surface; and
   wherein said pump rotor is directly and drivingly coupled to said input shaft, by engagement of said mating and inner surfaces, for common rotation therewith.

2. The pump of claim 1, wherein said mating surface includes a flat portion.

3. The pump of claim 2, wherein the hybrid transmission further includes an input housing and a pump housing, and further comprising:
   a pump pocket defined by said input housing, said pump housing, and said input shaft; and
   wherein said pump rotor operates in said pump pocket.

4. The pump of claim 3, wherein the pump is configured to be tested prior to mating the hybrid transmission to an engine.

5. The pump of claim 4, wherein an axial length of said pump rotor is less than an axial length of said input shaft and said pump rotor is bounded axially by said input shaft.

6. The pump of claim 5, further comprising a pump guide configured to center said pump rotor, wherein said pump guide is configured to be installed prior to said pump rotor.

7. A pump for a hybrid transmission, comprising:
   a transmission input shaft having a mating surface on an outer surface thereof;
   a pump rotor coaxial with said input shaft, having an inner surface corresponding to said mating surface, wherein said pump rotor is directly and drivingly coupled to said input shaft, by engagement of said mating and inner surfaces, for common rotation therewith;
   an input housing and a pump housing; and
   a pump pocket defined by said input housing, said pump housing, and said input shaft, wherein said pump rotor operates in said pump pocket.

8. The pump of claim 7, further comprising a pump guide configured to center said pump rotor, wherein said pump guide is configured to be installed prior to said pump rotor.

9. The pump of claim 8, wherein said mating surface includes a flat portion.

10. The pump of claim 9, wherein said pump rotor is bounded axially by said input shaft.

11. A pump for a hybrid transmission connected to an engine, comprising:
- an input shaft having a mating surface on an outer surface thereof, wherein the input shaft is a one-piece construction and is directly connected to an output of the engine;
- a pump rotor coaxial with said input shaft, having an inner surface corresponding to said mating surface; and
- wherein said pump rotor is directly and drivingly coupled to said input shaft, by engagement of said mating and inner surfaces, for common rotation therewith.

12. The pump of claim 11, wherein an axial length of said pump rotor is less than an axial length of said input shaft and said pump rotor is bounded axially by said input shaft.

13. The pump of claim 12, wherein the hybrid transmission further includes an input housing and a pump housing, and further comprising:
- a pump pocket defined by said input housing, said pump housing, and said input shaft; and
- wherein said pump rotor operates in said pump pocket.

14. The pump of claim 13,
- wherein said mating surface of said input shaft includes two outer flat portions, and
- wherein said inner surface of said pump rotor includes two inner flat portions, each corresponding to a respective one of said outer flat portions of said mating surface.

* * * * *